(12) United States Patent
Kahle et al.

(10) Patent No.: US 6,543,861 B1
(45) Date of Patent: Apr. 8, 2003

(54) TENSIONING DEVICE FOR TRACK APPARATUS

(75) Inventors: Glenn W. Kahle, Gibsonia, PA (US); David L. Juncker, Mt. Vernon, IN (US); Jamsheed Reshad, Newburgh, IN (US)

(73) Assignee: AgTracks, Inc., Mount Vernon, IN (US)

( * ) Notice: Subject to any disclaimer, the term of this patent is extended or adjusted under 35 U.S.C. 154(b) by 0 days.

(21) Appl. No.: 09/627,861

(22) Filed: Jul. 28, 2000

(51) Int. Cl.[7] .............................................. B62D 55/30
(52) U.S. Cl. ....................................... 305/143; 305/148
(58) Field of Search ................................ 305/135, 143, 305/145, 146, 147, 148; 267/113, 118, 124, 64.11

(56) References Cited

U.S. PATENT DOCUMENTS

| | | | | |
|---|---|---|---|---|
| 2,837,380 A | * | 6/1958 | Mazzarines | 305/148 |
| 3,539,229 A | | 11/1970 | Scully | |
| 3,912,335 A | * | 10/1975 | Fisher | 305/148 |
| 4,227,748 A | | 10/1980 | Meisel, Jr. | |
| 4,457,564 A | * | 7/1984 | Ruge et al. | 305/145 |
| 4,458,954 A | | 7/1984 | Haas | |
| 4,537,267 A | | 8/1985 | Satzler | 180/9.1 |
| 4,681,177 A | | 7/1987 | Zborowski | 180/9.56 |
| 4,726,631 A | * | 2/1988 | Jones et al. | 305/143 |
| 4,826,141 A | * | 5/1989 | Buma et al. | 267/64.28 |
| 4,840,437 A | | 6/1989 | Henry et al. | |
| 4,854,650 A | * | 8/1989 | Getz et al. | 305/143 |
| 4,859,006 A | * | 8/1989 | Philippe et al. | 305/148 |
| 5,165,765 A | | 11/1992 | Baylor | |
| 5,219,152 A | * | 6/1993 | Derrien et al. | 167/64.16 |
| 5,246,246 A | | 9/1993 | Kendall | 280/677 |
| 5,316,381 A | * | 5/1994 | Issacson et al. | 305/135 |
| 5,482,126 A | | 1/1996 | Bouit et al. | 180/9.1 |
| 5,515,935 A | | 5/1996 | Lagace | 180/9.1 |
| 5,515,936 A | | 5/1996 | Lagace | 180/9.1 |
| 5,984,436 A | | 11/1999 | Hall | 305/145 |
| 5,997,109 A | | 12/1999 | Kautsch | 305/129 |
| 6,024,183 A | | 2/2000 | Dietz et al. | 180/9.1 |
| 6,027,185 A | | 2/2000 | Crabb | 305/148 |
| 6,062,327 A | | 5/2000 | Kettling et al. | 180/9.52 |

* cited by examiner

*Primary Examiner*—Russell D. Stormer
(74) *Attorney, Agent, or Firm*—Jansson, Shupe & Munger, LTD

(57) ABSTRACT

A tensioning device is provided for maintaining the tension on a continuous flexible track of a track apparatus. The track apparatus includes an idler wheel which engages the flexible track and which is movable between a first non-deflected position and a second deflected position. A dampening mechanism extends between an idler axle which supports the idler wheel and the frame of the track apparatus in order to exert a force on the idler axle to urge the idler wheel towards the non-deflected position. The dampening mechanism progressively increases the force on the idler axle as the idler wheel moves towards the deflected position.

21 Claims, 12 Drawing Sheets

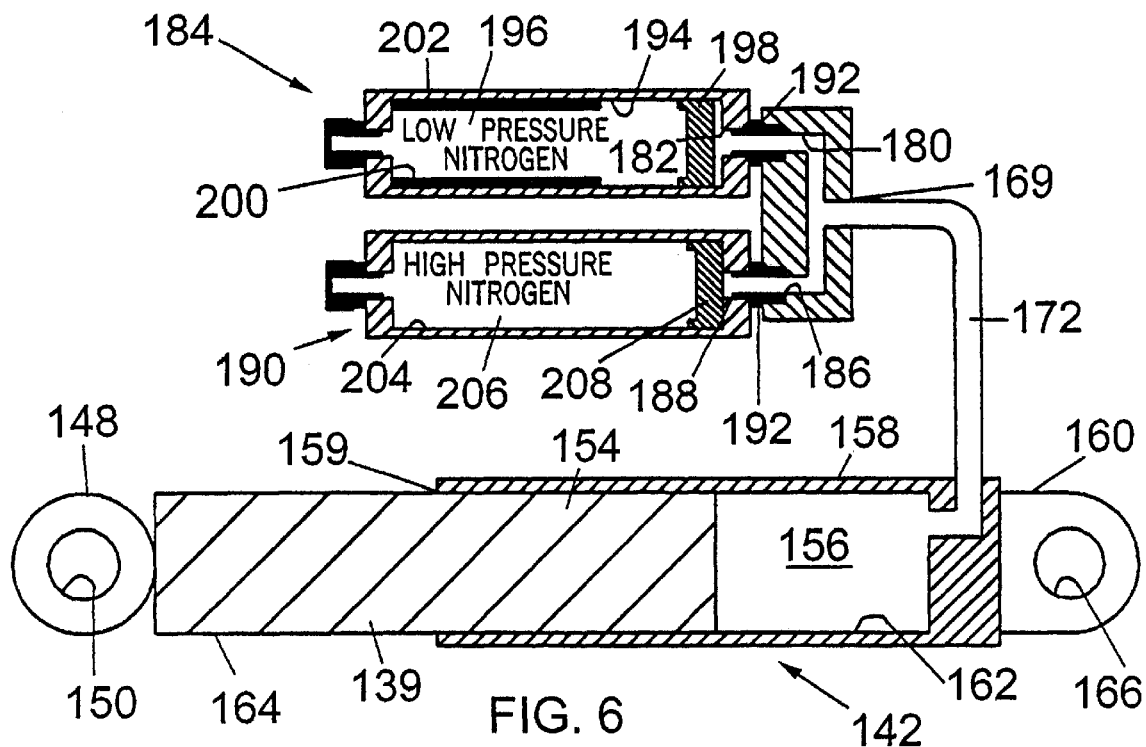
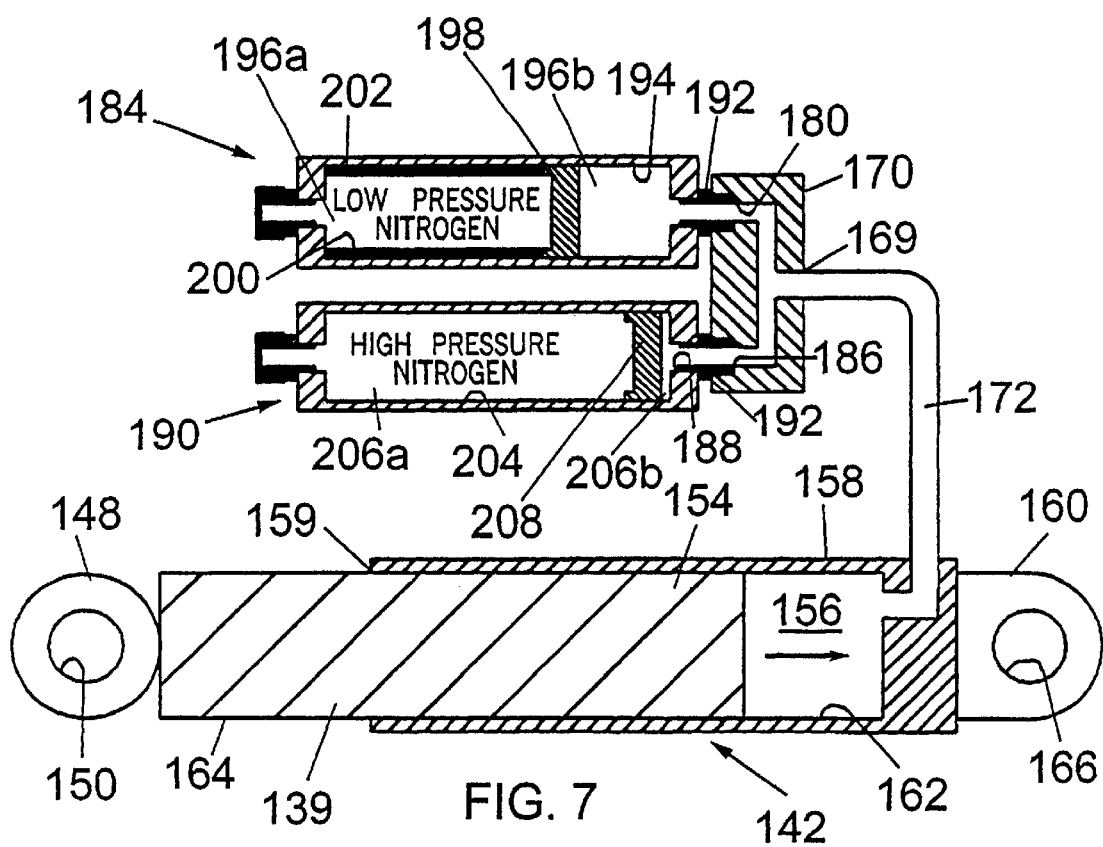

TENSIONING DEVICE FOR TRACK APPARATUS

FIELD OF THE INVENTION

This invention relates generally to track apparatus for vehicles. In particular, this invention relates to track apparatus of the type for use in place of a vehivle wheel and, more particularly, to apparatus for maintaining proper tension on flexible tracks during operation.

BACKGROUND OF THE INVENTION

Agricultural vehicles such as tractors, combines and the like are commonly used in agricultural fields for a variety of jobs, and construction vehicles and other large work vehicles are used for many different jobs on a variety of ground surfaces. Typically, these vehicles have tires on which the vehicles are supported on the ground. These kinds of large vehicles are quit heavy, and their weight is distributed to a relatively small area by the vehicle tires. As a result, the tires of such vehicles tend to compact the soil in the fields or other ground surfaces. Compacted soil discourages growth of crops planted in the fields with need loose soil to flourish, and ground surface compaction is often undesirable for other reasons as well.

In addition, since fields and other work sites are often wet due to rain or watering, vehicles which enter the fields become bogged down in the mud due to the fact that there is such a small area in contact with the ground. Therefore, it is highly desirable to develop a track apparatus for vehicles which spreads vehicle weight over a larger area so as to reduce the degree of ground compaction. Providing a larger ground-surface engagement area also serves to prevent vehicles from becoming bogged down in mud or other soft ground surfaces.

Prior track systems for vehicles is disclosed in U.S. Pat. Nos. Re36,284 (Kelderman) and 5,829,848 (kelderman), assigned to the assignee of the present invention and incorporated herein by reference. The Kelderman '284 reissue and '848 patents disclose track suspension systems for vehicles having a frame and a continuous rubber track. The drive wheel is attached to the frame for engaging and driving the continuous flexible track.

In order to insure proper operation of such track apparatus, the tension on the flexible track must be maintained within a predetermined range. Both a lack of sufficient tension and excessive tension are problematic.

By way of example, a minimum tension must be maintained on the flexible track to prevent slippage thereof during operation of the track apparatus -- i.e., inconsistent engagement of the track with leading and trailing idler wheels. Improper track tension is problematic in operation and leads to misalignment and premature wear of the flexible track may result in a loss of horsepower and premature wear of the track.

Furthermore, the flexible track of such track apparatus encounters obstacles (e.g. rocks) and other ground-surface irregularities during operation. It is important that the track accomodate irregularities and sudden shocks in order to maintain acceptable operational tension: (1) the matter of maintaining proper tension under normal operation conditions and (2) the ability to accommodate obstacles and the like.

While proper track apparatus have tensioning devices, such tensioning devices have problems and shortcomings in their ability to maintain proper tension in a wide variety of surface conditions. There is a need for improved tensioning apparatus to maintain proper track tension and better accommodate obstacles and a variety of surface irregularities during operation.

OBJECTS OF THE INVENTION

It is an object of this invention to provide an improved track apparatus, of the type for use in place of a vehicle wheel, which overcomes some of the problems and shortcomings of the prior art, including those referred to above.

More particularly, it is an ovject of this invention to provide an improved track tensioning apparatus which overcomes the problems and shortcomings of the prior art referred to abovr.

Another object of the invention is to provide a track apparatus which maintains a predetermined tension on the track in a variety of use conditions.

Another object of this invention is to provide a track tensioning apparatus which avoids or minimizes track "slippage" and misalignment during use.

Another object of the invention is to provide an improved track tensioning apparatus which better accommodates a wide range of track deflection of the track, caused by a variety of obstacles.

A still further object of the invention is to provide a track apparatus with a tensioning device which is simple, inexpensive to manufacture and maintain, and independent of the vehicle.

BRIEF SUMMARY OF THE INVENTION

In accordance with the present invention, a tensioning device is provided for maintaining proper tension on a continuous flexible track utilized on a track apparatus of the type mountable on the rotatable axle of a vehicle.

The track apparatus includes: a frame; a drive wheel structure rotatably mounted with respect to the frame, the drive wheel having an upper circumferential portion engaging the inner surface of a flexible track along the upper length thereof and a lower circumferential portion spaced above the lower length of the track; and leading and trailing idler assemblies having idler wheels engaging the track. The tensioning device includes a dampening mechanism which extends betwee an idler assembly and the frame for exerting a force on the idler axle so as to urge the idler wheel towards the non-deflected position. The dampening mechanism provides force on the idler axle as the idler wheel moves towards the deflected position. The idler assembly includes an idler axle support pivotably mounted to the frame. The idler axle extends through the idler axle support.

The tensioning device of this invention includes a main-cylinder housing interconnected to the frame. The main-cylinder housing extends along an axis and defines a main cylinder chamber therein. A main position has a first end pivotably connected to the leading idler wheel assembly and a second end slidably received within the main-cylinder chamber. The main piston is movable between a first extended position in response to the idler wheel being in a non-deflected position and a second retracted position in response to the idler wheel being in the deflected position. A primary dampening structure discourages movement of the main piston toward the retracted position for a first predetermined axial length. A secondary dampening structure discourages movement of the main piston toward the retracted position for a second predetermined axial length.

The primary dampening structure includes a primary-dampening cylinder which extends along an axis and defines a primary chamber therein. A primary-dampening piston is slidably received within the primary-dampening cylinder and is movable axially between a first position and a second position. The primary-dampening piston divides the primary-dampening chamber into a first portion for receiving a pressurized gas and a second portion. A fluid conduit interconnects the second portion of the primary-dampening chamber and the main-cylinder chamber. A fluid is disposed within the second portion of the primary-dampening chamber; the main-cylinder chamber, and the fluid conduit therebetween.

Similarly, the secondary dampening structure includes a secondary-dampening cylinder extending along an axis and defining a secondary-dampening chamber therein. A secondary-dampening piston is slidably received in the secondary-dampening cylinder and is movable axially between a first position and a second position. The secondary-dampening piston divides the secondary-dampening chamber into a first portion for receiving a pressurized gas and a second portion. The fluid conduit also interconnects the second portion of the secondary-dampening chamber and the main-cylinder chamber. In addition, the fluid is also disposed in the second portion of the secondary-dampening chamber.

It is contemplated that the pressure of the pressurized gas in the first portion of the secondary-dampening chamber is greater than the pressure of the pressurized gas in the first portion of the primary-dampening chamber. A limiter may be provided within the primary-dampening cylinder for limiting movement of the primary-dampening piston.

The tensioning device may include a manifold having an input, a first output connected to the input of the secondary-dampening cylinder, and a second input connected to the input of the secondary-dampening cylinder. The fluid conduit interconnects the input of the manifold and the main-cylinder chamber. The fluid is disposed within the fluid conduit for travel between the second portion of the primary-dampening chamber, the second portion of the secondary-dampening chamber, and the main-cylinder chamber.

In accordance with a still further aspect of the present invention, the tensioning device a main cylinder housing interconnected to the frame of the track apparatus, such main-cylinder housing extends along an axis and defining a main-cylinder chamber therein. A main piston has a first end pivotably connected to the idler wheel and a second end slidably received within the main-cylinder chamber, and is movable between a first retracted position and a second extended position. A dampening mechanism which is mounted at a position remote from the main piston is operatively connected to the second end of the main piston and provides a force for discouraging movement of the main piston toward the retracted position. Such remote dampening mechanism progressively increases the force on a second end of the main piston as the main piston moves toward the retracted position. The remote dampening mechanism may include primary and secondary dampening as described above.

In accordance with a still further aspect of the present invention, a track apparatus is provided having the improved tensioning apparatus as described above.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

FIG. 6 is a schematic view of the belt tensioning device of the track apparatus, such device being shown in a first extended position.

FIG. 7 is a schematic view of the belt tensioning device in a second intermediate position.

DETAILED DESCRIPTION OF PREFERRED EMBODIMENTS

Figure 1:
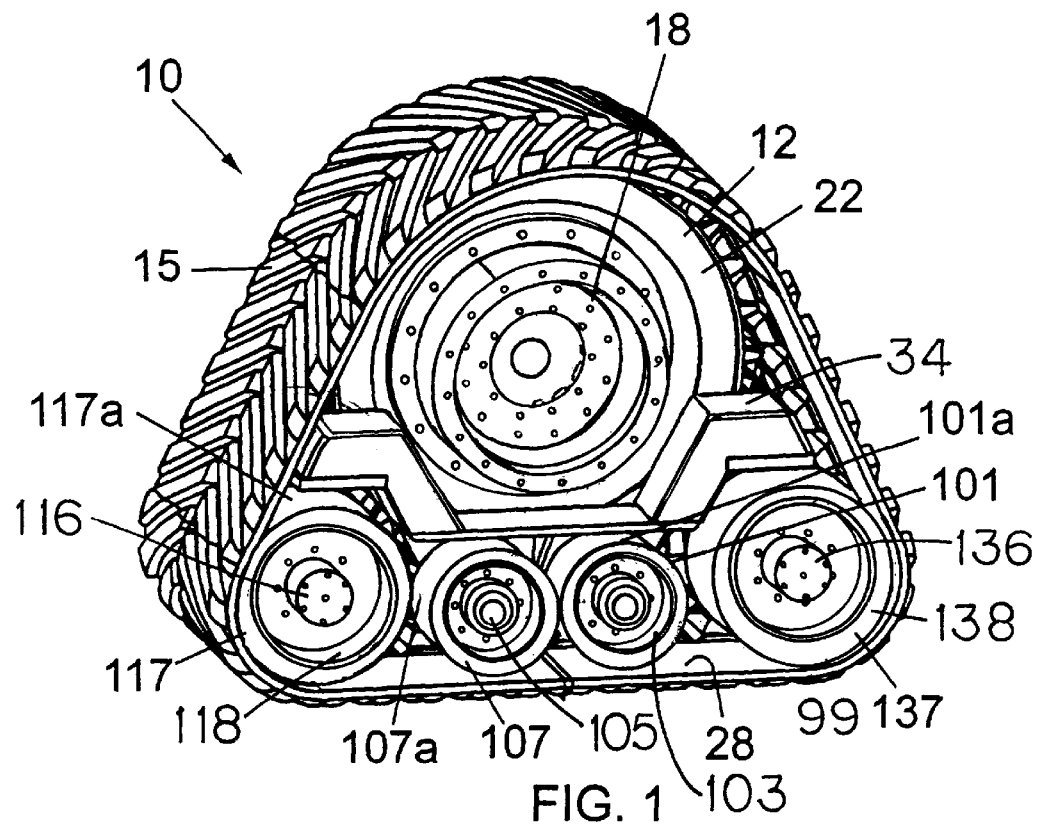
FIG. 1 is a rear isometric view of a track apparatus for a vehicle incorporating a drive wheel in accordance with the present invention.
Figure 2:
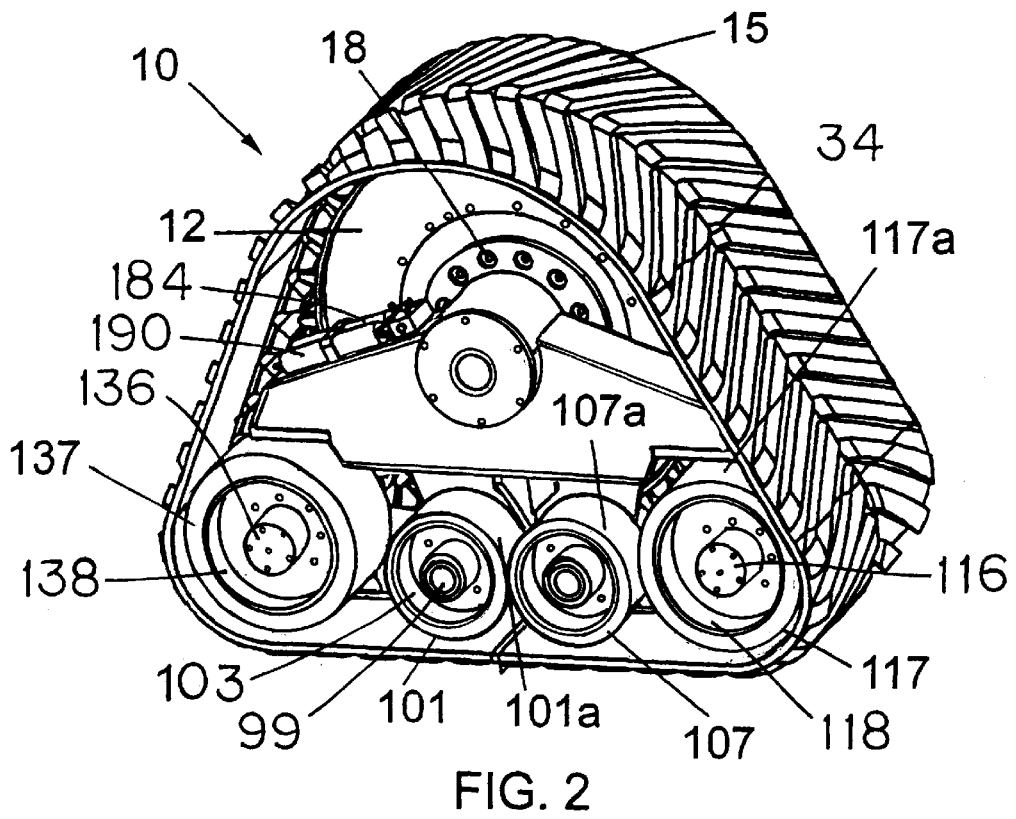
FIG. 2 is a front isometric view of the track apparatus.

Referring to FIGS. 1–2, a track system is generally designated by the reference numeral 10. In a preferred embodiment, the track apparatus 10 is mounted on an axle (not shown) of an agricultural vehicle such as a tractor or combine. However, it is contemplated as being within the scope of the present invention for track apparatus 10 to be mounted on other types of vehicles such as trucks, automobiles, and the like.

Track apparatus 10 includes a drive wheel 12 which mountable to the axle of a vehicle for rotational movement therewith in order to drive a flexible track 15. As best seen in FIG. 1, in the preferred embodiment, it is intended to mount track apparatus 10 to a vehicle having a planetary axle. However, it is contemplated to mount track system 10 to a bar axle or other type of axle without deviating from the scope of the present invention.

Referring to FIG. 2, drive wheel 12 includes a first set of circumferentially spaced attachment openings 18 therein which are aligned with corresponding openings formed in an attachment flange extending radially from the axle of the vehicle, as is conventional. Bolts extend through attachment openings 18 in drive wheel 12 and through corresponding openings in the attachment flange of the axle and are secured by corresponding nuts threaded on the ends thereof in order to interconnect the axle of the vehicle to drive wheel 12 so as to allow drive wheel 12 to rotate in unison with the axle of the vehicle.

Figure 3:
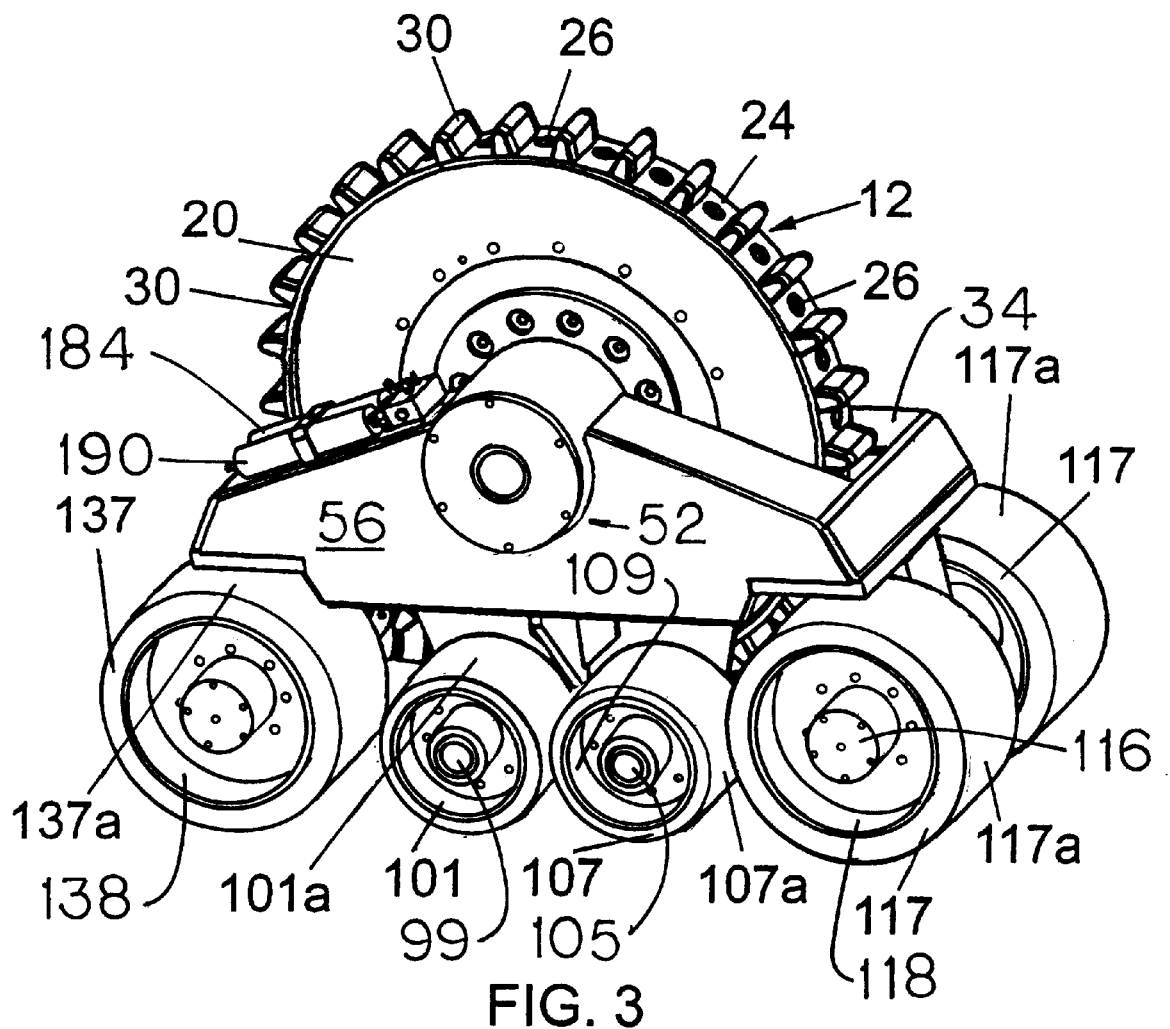
FIG. 3 is a front isometric view of the track apparatus with the flexible track removed.

As best seen in FIGS. 1–3, drive wheel 12 includes an inner wall or side-surface 20 and an outer wall or side-surface 22 interconnected by a radially outer rim 24. Outer rim 24 includes a plurality of circumferentially spaced openings 26 therein for allowing debris which may accumulate on the inner surface 28 of flexible track 15 to pass therethrough. As shown in FIG. 10, outer rim 24 further includes an outer surface 29 having a plurality of circumferentially spaced drive members 30 projecting radially therefrom. As hereinafter described, drive members 30 are intended to engage corresponding track lugs 32 projecting inwardly from the inner surface 28 of flexible track 15 in order to drive flexible track 15.

Figure 11:
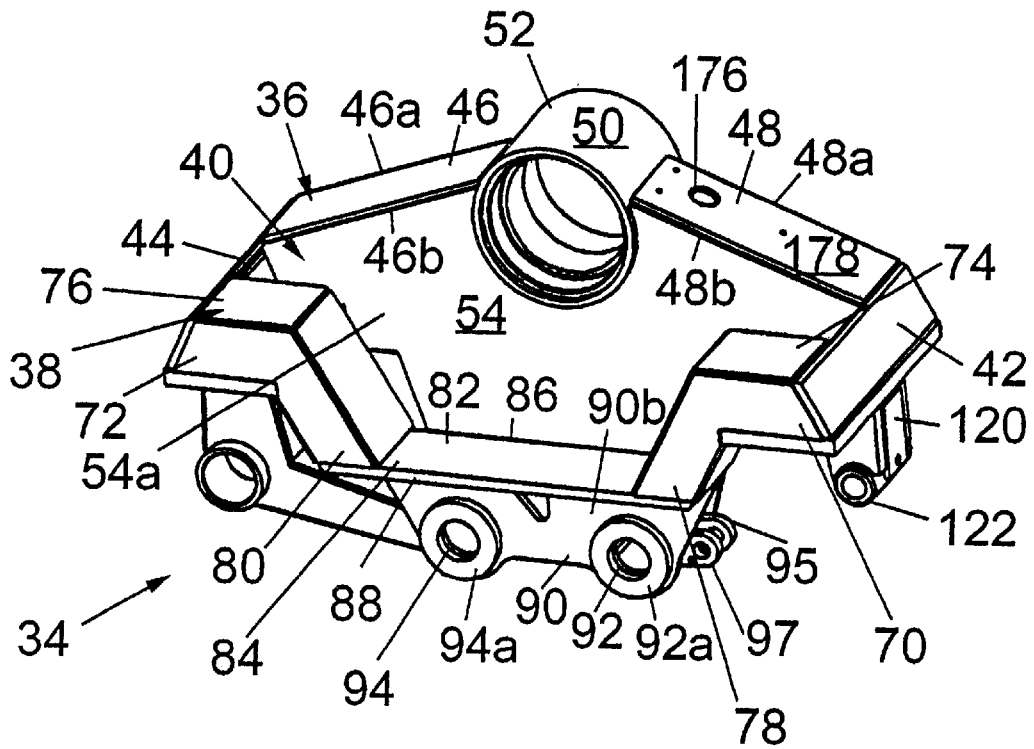
FIG. 11 is a rear isometric view of the frame of the track apparatus of FIG. 1.
Figure 12:
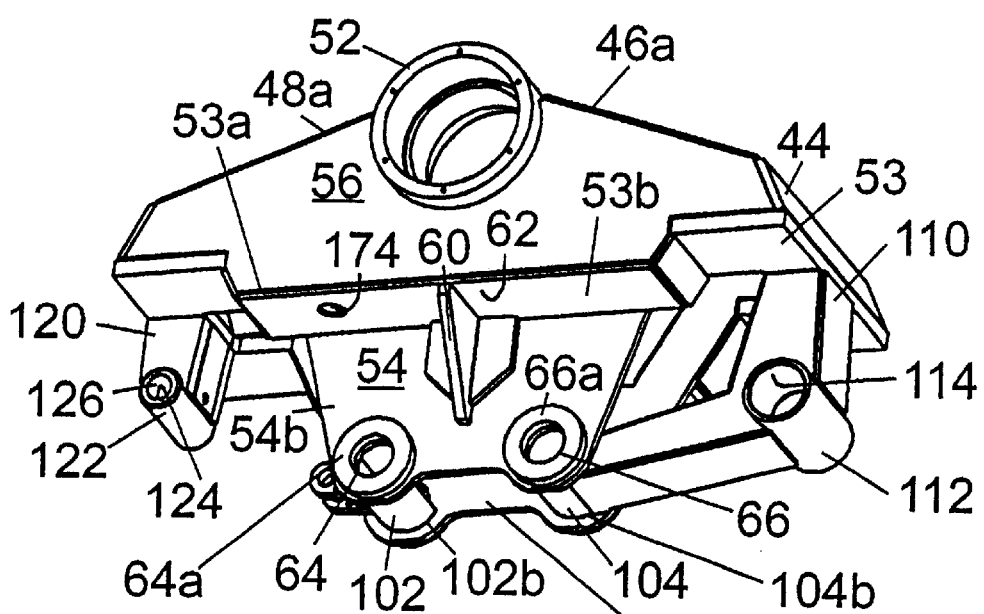
FIG. 12 is a front isometric of the frame.
Figure 12B:
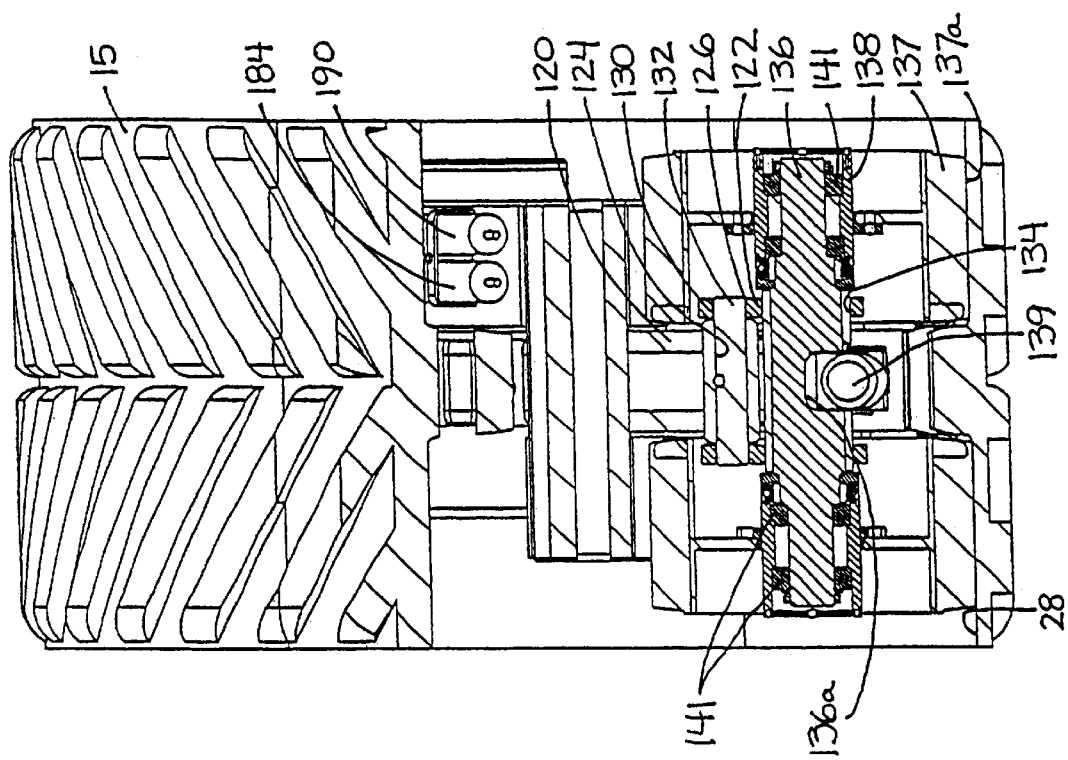
Figure 12A:
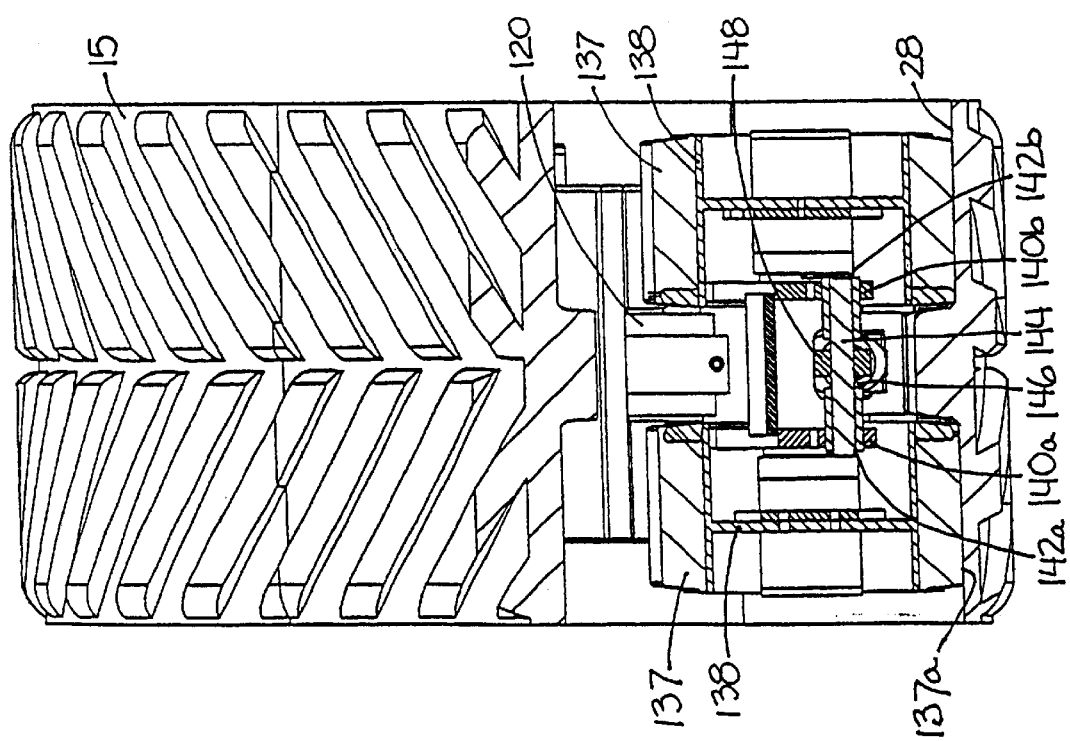
Figure 13:
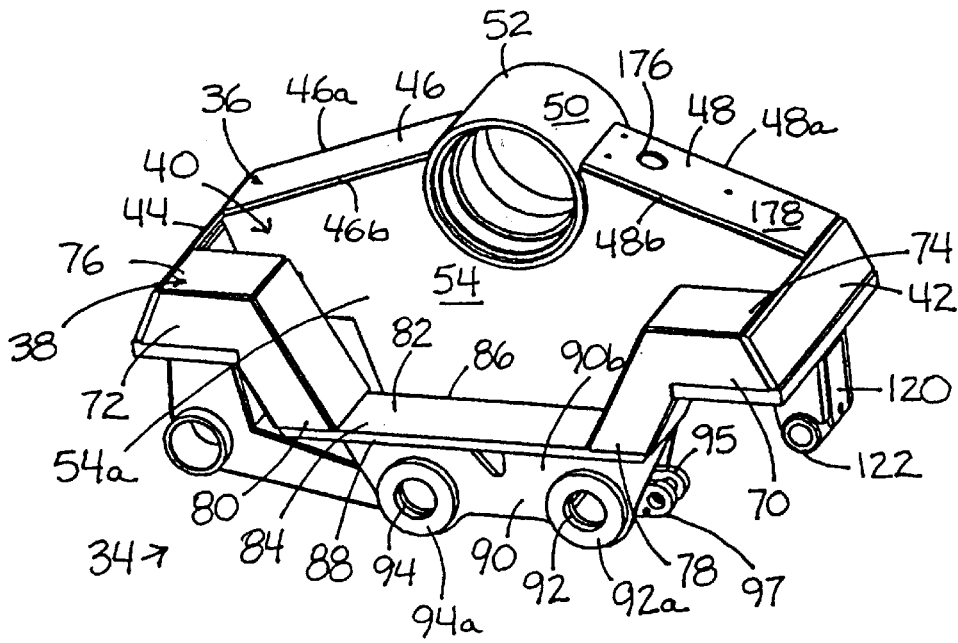
Figure 14:
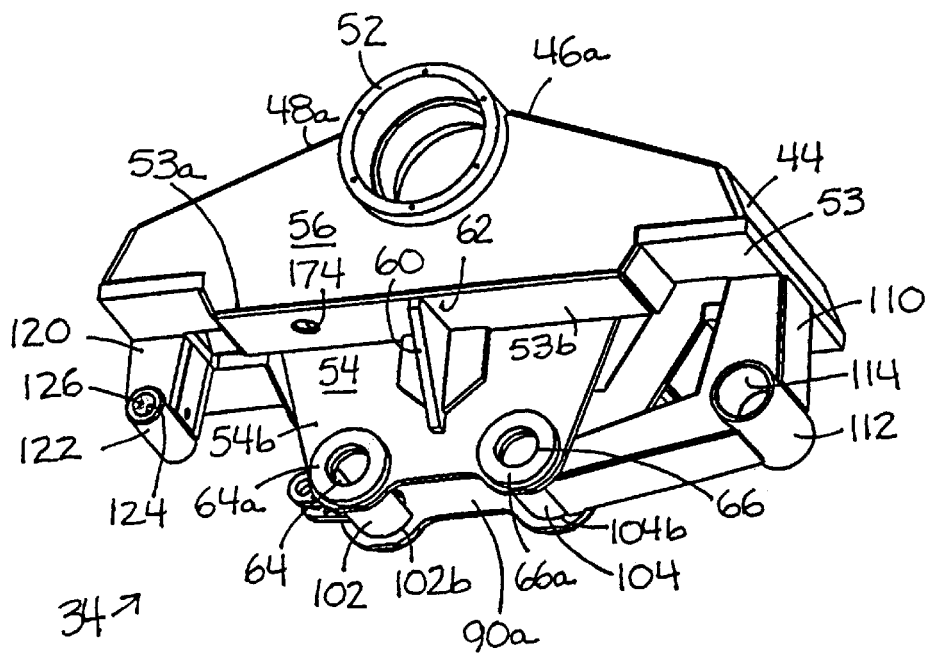
Figure 15:
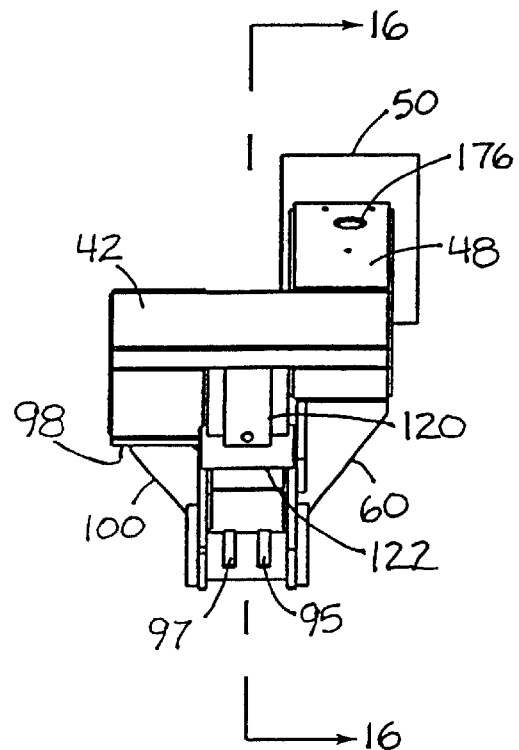
Figure 16:
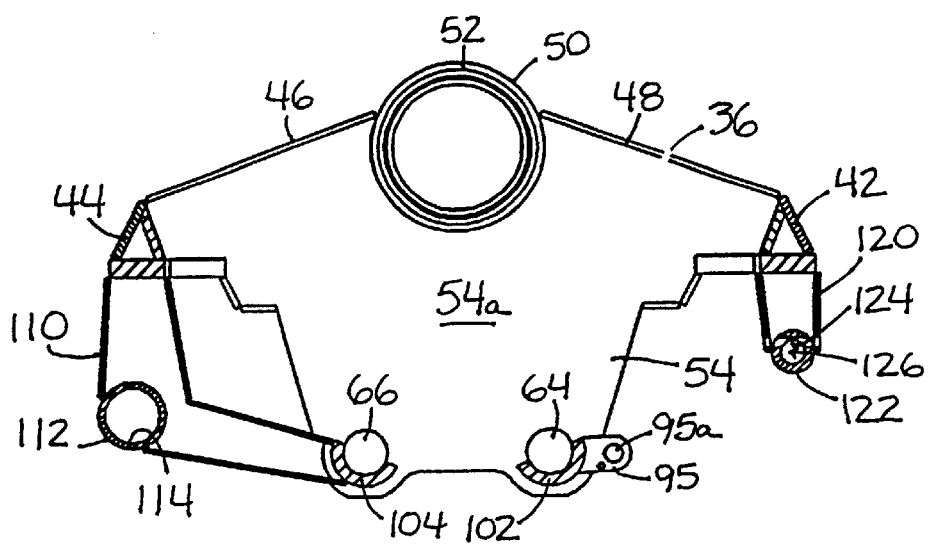
Figure 17:
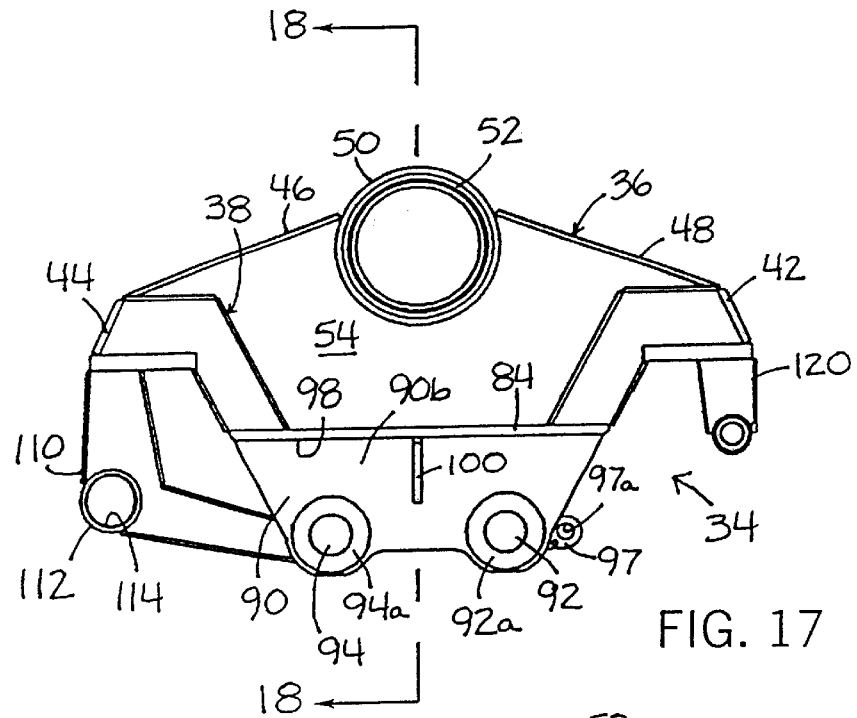
Figure 18:
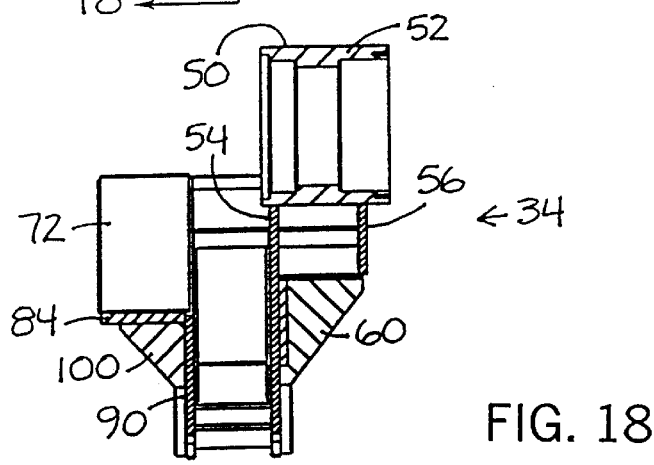
Figure 19:
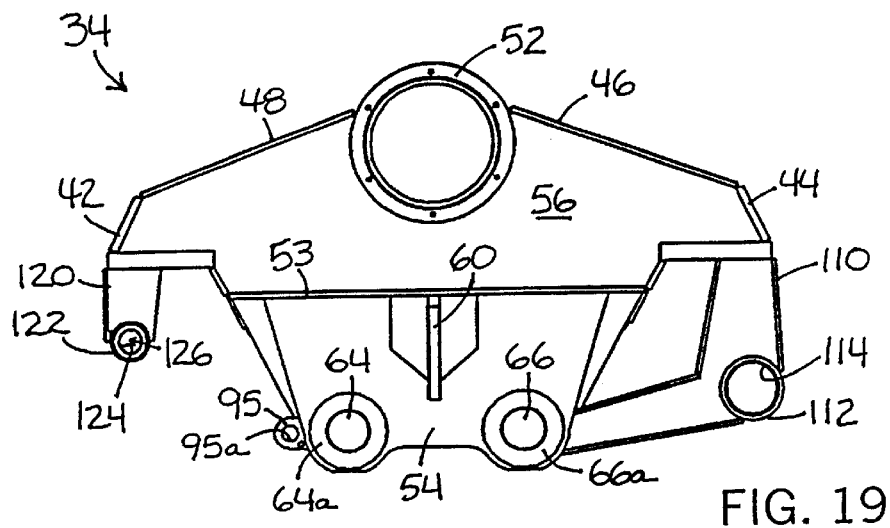

As best seen in FIGS. 11–12, track apparatus 10 further includes frame 34 of a uni-body construction. Frame 34 includes first and second side portions 36 and 38, respectively, which define a drive wheel receipt well 40 therebetween for receiving drive wheel 12. Side portions 36 and 38 of frame 34 are interconnected by front and rear end panels 42 and 44, respectively.

Side portion 36 includes first and second upper panels 46 and 48, respectively, which extend laterally from outer surface 50 of generally tubular spindle hub 52 and a lower panel 53. Side panel 56 interconnects first sides 46a and 48a of upper panels 46 and 48, respectively, and first side 53a of lower panel 53. Side panel 54 projects from second sides 46b and 48b of upper panels 46 and 48, respectively, and is joined to second side 53b of lower panel 53. A support member 60 extends between outer surface 54b of side panel 54 and lower surface 62 of lower panel 53 to add strength and stability to side panel 54 during operation of track system 10. In the preferred embodiment, support member 60 takes the form of a gusset, but other configurations are possible without deviating from the scope of the present invention. Side panel 54 includes leading and trailing apertures 64 and 66, respectively, therethrough for receiving corresponding leading and trailing bogie axles, respectively, as hereinafter described. Reinforcement elements 64a and 66a may be mounted on outer surface 54b of side panel 54 about corresponding apertures 64 and 66, respectively, to reinforce apertures 64 and 66 and prevent deformation of the same by the bogie axles received therein.

Side portion 38 of frame 34 includes generally tubular, forward and rearward arms 70 and 72, respectively. Forward arm 70 includes a first end 74 which is joined to front end panel 42. Similarly, rearward arm 72 includes a first end 76 joined to rear end panel 44. Second ends 78 and 80 of forward and rearward arms 70 and 72, respectively, are interconnected to the upper surface 82 of a generally horizontal base plate 84. Base plate 84 includes an inner edge 86 directed towards drive wheel receipt well 40 and an outer edge 88. Side panel 90 depends from inner edge 86 of base plate 84 and includes leading and trailing apertures 92 and 94, respectively, therethrough for receiving corresponding leading and trailing bogie axles, as hereinafter described. Leading aperture 92 in side panel 90 of side portion 38 is axially aligned with leading aperture 64 in side panel 54 of side portion 36. Likewise, trailing aperture 94 in side panel 90 of side portion 38 is axially aligned with trailing aperture 66 in side panel 54 of side portion 36. Reinforcement elements 92a and 94a may be mounted on outer surface 90b of side panel 90 about corresponding apertures 92 and 94, respectively, to reinforce apertures 92 and 94 and prevent deformation of the same by the bogie axles received therein. Outer surface 90b of side panel 90 of side portion 38 is innerconnected to the lower surface 98 of base plate 84 by a support structure 100 to add strength and stability to side panel 90. In the preferred embodiment, support member 100 takes the form of a gusset, but other configurations are possible without deviating from the scope of the present invention.

A leading bogie axle 99 extends through leading aperture 64 in side panel 54 and through leading aperture 92 in side panel 90. Leading bogie wheels 101 are mounted on rims 103, FIGS. 1–2, in a conventional manner which, in turn, are mounted on corresponding ends of leading bogie axle 99 in a conventional manner for rotational movement therewith. The outer surfaces 101a of leading bogie wheels 101 engage the inner surface 28 of flexible track 15. Similarly, a trailing bogie axle 105 extends through trailing aperture 66 in side panel 54 and through trailing aperture 94 in side panel 90. Trailing bogie wheels 107 are mounted on rims 109 (see FIGS. 1–2) in a conventional manner which, in turn, are mounted on opposite ends of trailing bogie axle 105 in conventional manner for rotational movement therewith. The outer surfaces 107a of trailing bogie wheels 107 engage the inner surface 28 of flexible track 15.

Inner surface 54a of side panel 54 of side portion 36 is interconnected to inner surface 90a by leading and trailing bogie axle shrouds 102 and 104, respectively. Leading bogie axle shroud 102 is generally arcuate in shape and has a first end positioned adjacent leading aperture 64 in side panel 54 of side portion 36 and a second opposite end 102b adjacent leading aperture 92 in side panel 90 of side portion 38 so as to partially surround leading bogie axle 99. First and second spaced mounting flanges 95 and 97 project from leading bogie axle shroud 102. Mounting flanges 95 and 97 include corresponding openings 95a and 97a, respectively, therein for reasons hereinafter described. Trailing bogie axle shroud 104 is arcuate in shape and includes a first end positioned adjacent to trailing aperture 66 in side panel 54 of side portion 36 and a second end 104b positioned adjacent trailing aperture 94 in side panel 90 of side portion 38 so as to partially surround trailing bogie axle 105.

Frame 34 further includes a trailing idler axle support arm 110 which extends between trailing bogie axle shroud 104 and rear end panel 44. Trailing idler axle support arm 110 includes a generally tubular trailing idler axle support 112 having an inner surface 114 for rotatably supporting trailing idler axle 116. Trailing idler wheels 117 are mounted on rims 118 (see FIGS. 1–2) in a conventional manner which, in turn, are mounted on corresponding ends of trailing idler axle 116 in a conventional manner for rotational movement therewith. Trailing idler wheels 117 include radially outer surfaces 117a for engaging the inner surface 28 of flexible track 15.

Figure 5:
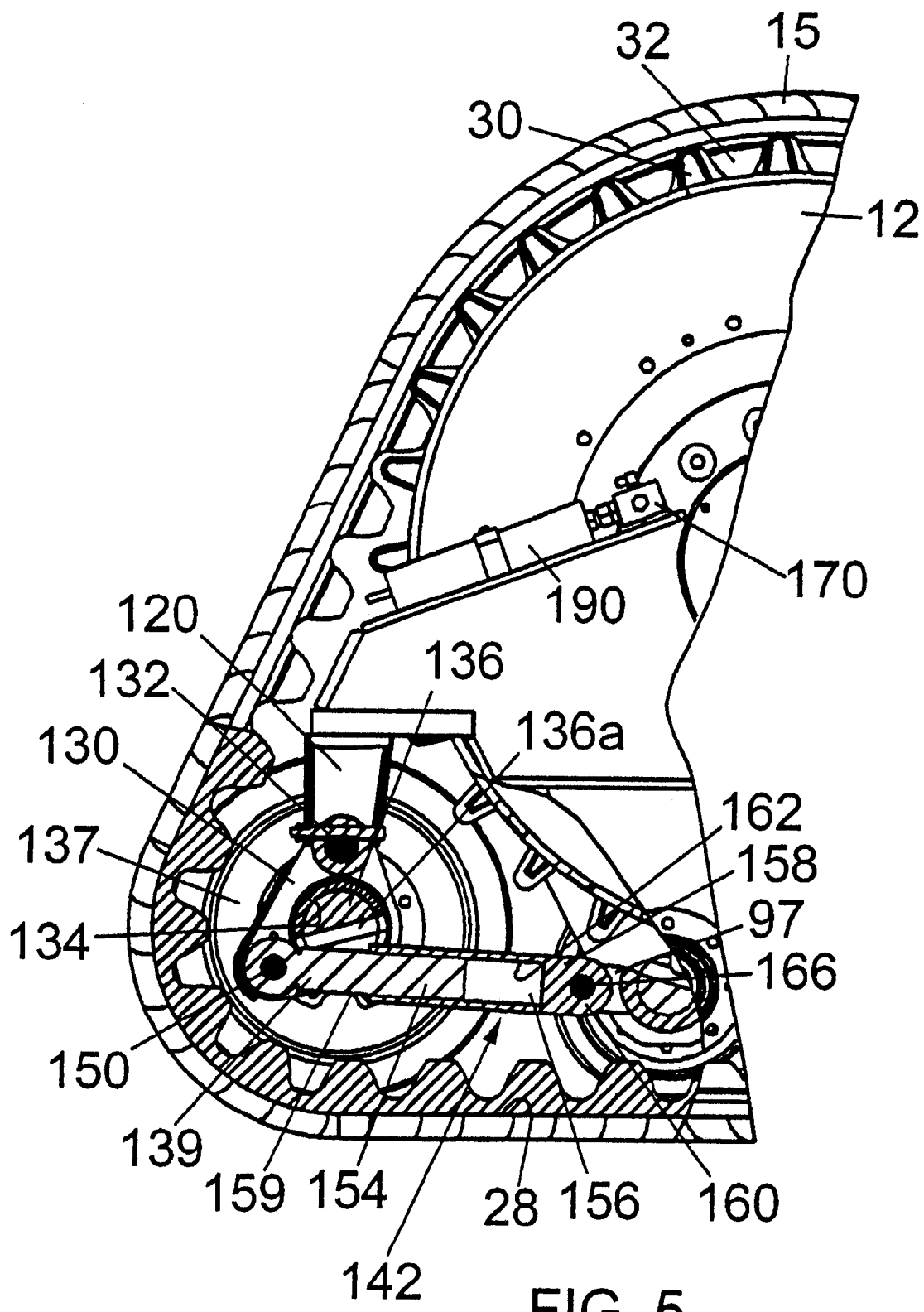
FIG. 5 is a fragmentary front elevational, partially in section, of the track apparatus.
Figure 10B:
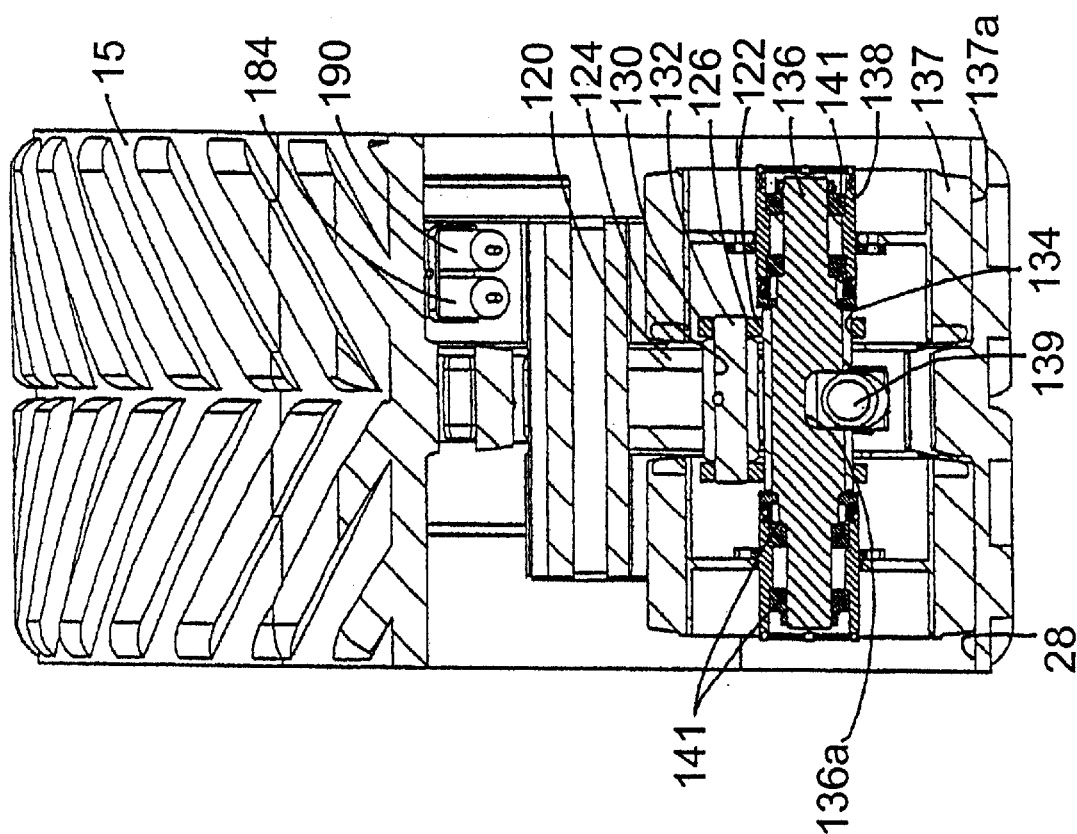
FIG. 10b is a vross-sectional view taken along line 12b–12b of FIG. 4.
Figure 10A:
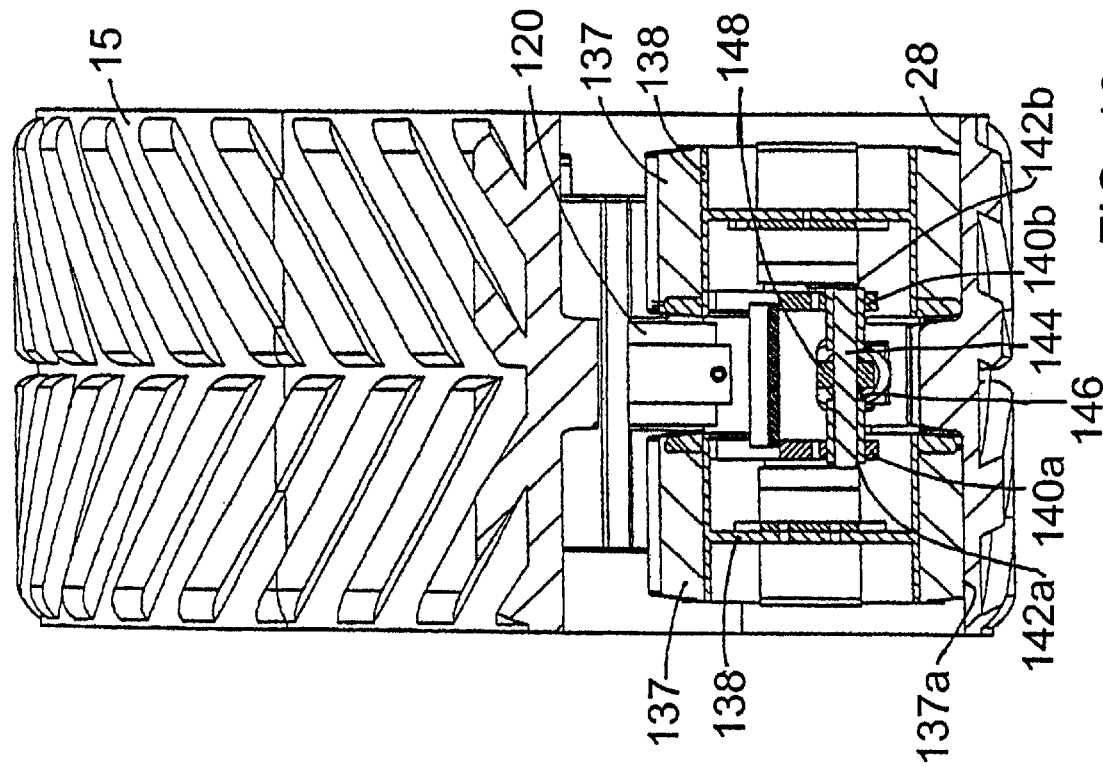
FIG. 10a is a cross-sectional view taken along line 12a–12a of FIG. 4.

Frame 34 further includes a leading idler axle support arm 120 depending from front end panel 42. Referring to FIGS. 5 and 10a–10b, leading idler axle support arm 120 has a generally tubular terminal end 122 having an inner surface 124 defining a passageway 126 therethrough. Leading idler axle support 130 is pivotally mounted to leading idler support arm 120 by mounting pin 132 extending through passageway 126 in terminal end 122. Leading idler axle support 130 includes a leading idler axle passageway 134 for allowing leading idler axle 136 to pass therethrough. Leading idler axle 136 includes a notch 136a formed therein for allowing piston shaft 139 of cylinder 142 to extend therepast.

As is conventional, leading idler axle 136 supports leading idler wheels 137 on opposite ends thereof. Leading idler wheels 137 are mounted on rims 138 which, in turn, are mounted on corresponding ends of leading idler axle 136 in a conventional manner for rotational movement therewith. It is contemplated to provide bearings 141 between rims 138 and corresponding ends of leading idler axle 136 to facilitate rotation of leading idler wheels 137 thereabout. Leading idler wheels 137 include a radially outer surface 137a for engaging the inner surface 28 of flexible track 15.

Figure 8:
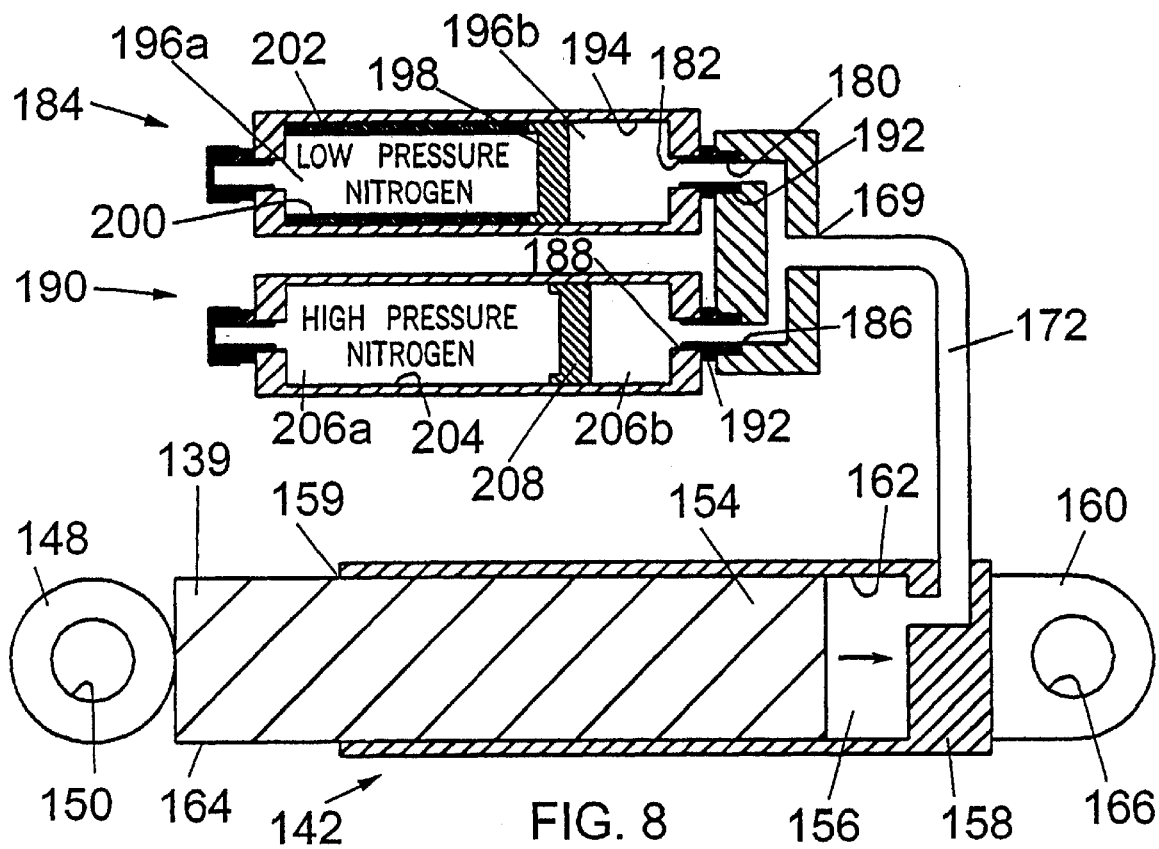
FIG. 8 is a schematic view of the belt tensioning device in a third retracted position.

Leading idler axle support 130 further includes a first and second piston mounting ears 140a and 140b depending therefrom. Each mounting ear 140a and 140b includes a corresponding aperture 142a and 142b, respectively, therethrough to accommodate piston shaft mounting pin 144. Apertures 142a and 142b in piston shaft mounting ears 140a and 140b, respectively, are axially aligned. Piston shaft mounting ears 140a and 140b define a piston receipt cavity 146 therebetween for receiving terminal end 148 of piston shaft 139. As best seen in FIGS. 6–8, terminal end 148 of piston shaft 139 includes an opening 150 for receiving mounting pin 144 such that piston shaft 139 of cylinder 142 may pivot on mounting pin 144.

Referring to FIGS. 6–9, main piston shaft 139 includes a second opposite end 154 received within chamber 156 within cylinder housing 158 of cylinder 142. Cylinder housing 158 includes a first open end 159 for allowing piston shaft 139 to be inserted within main-cylinder chamber 156 and an opposite closed end 160. Inner surface 162 of cylinder housing 158 forms a slidable interface with the outer surface 164 of piston shaft 139. Closed end 160 of cylinder housing 158 includes a dog ear having an opening 166 passing therethrough. Closed end 160 of cylinder housing 158 is positioned between mounting flanges 95 and 97 (see FIG. 11, as well as FIGS. 4 and 5) such that opening 166 in closed end 160 is aligned with openings 95a and 97a in mounting flanges 95 and 97, respectively. Pin 168 (see FIG. 5) extends through openings 95a and 97a in mounting flanges 97 and 99, respectively, and through opening 166 in closed end 160 of cylinder housing 158 so as to pivotally connect cylinder 142 to frame 34.

Figure 4:
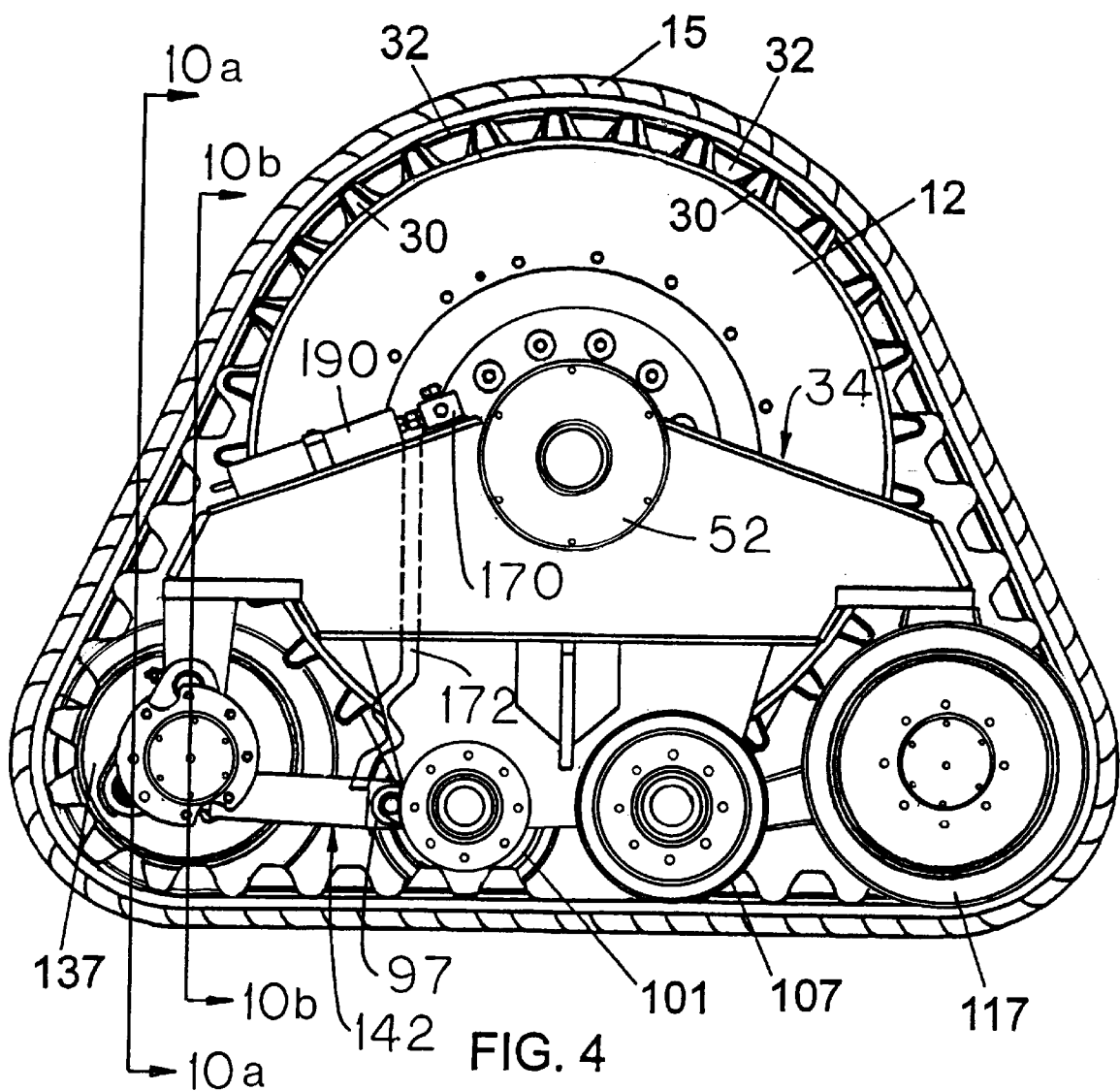
FIG. 4 is a front elevation of the track apparatus.

Referring once again to FIGS. 6–8, chamber 156 within cylindrical housing 158 communicates with input 169 of manifold 170 through conduit 172. As best seen in FIGS. 4, 11 and 12, conduit 172 extends through opening 174 in lower panel 53 of side portion 36 of frame 34 and through opening 176 in upper panel 48 of side portion 36 of frame 34. In a preferred embodiment, manifold 170 is mounted to upper surface 178 of upper panel 48. Manifold 170 includes a first output 180 operatively connected to the input 182 of low pressure cylinder 184 and a second output 186 operatively connected to the input 188 of high pressure cylinder 190. Seals 192 are provided between the outputs 180 and 186 of manifold 170 and the inputs 182 and 188 of cylinders 184 and 190, respectively, to maintain the integrity of the connections therebetween.

Primary-dampening cylinder 184 includes an inner surface 194 defining a primary-dampening chamber 196 therein. A primary-dampening piston 198 is slidably received within chamber 196 so as to divide chamber 196 into a first portion 196a for receiving low pressure nitrogen gas therein and a second portion 196b which communicates with chamber 156 within cylinder housing 158 through manifold 170 and conduit 172. A generally tubular limiter member 200 is positioned within chamber 196. Limiter member 200 includes an outer surface 202 which engages the inner surface 194 of cylinder 184. Limiter member 200 limits movement of piston 198 such that piston 198 is slidable between a first position (see FIG. 6) and a second position (see FIGS. 7 and 8).

Secondary-dampening cylinder 190 includes an inner surface 204 defining a secondary-dampening chamber 206 therein. A secondary-dampening piston 208 is slidably received within chamber 206 so as to divide chamber 206 into a first portion 206a for receiving a high pressure nitrogen gas therein and a second portion 206b which communicates with chamber 156 within cylinder housing 158 through manifold 170 and conduit 172. It is contemplated to provide a fluid within chamber 156 of cylinder housing 158, conduit 172, manifold 170, and second portions 196b and 206b of chambers 196 and 206, respectively, in cylinders 184 and 190, respectively.

As main piston shaft 139 moves into main-cylinder chamber 156 of cylinder housing 158, from left to right in FIGS. 6–8, fluid is urged from chamber 156 through conduit 172 into manifold 170. Given that the first portion 196a of primary-dampening chamber 196 of cylinder 184 is filled with a low pressure nitrogen gas and that the first portion 206a of secondary-dampening chamber 206 of cylinder 190 is filled with a high pressure nitrogen gas, the fluid within manifold 170 will take the path of least resistance and urge piston 198 within chamber 196 from right to left in FIGS. 6–8 against the bias of the low-pressure nitrogen gas in first portion 196a of chamber 196 in cylinder 184. Travel of piston 198 within chamber 196 is terminated when piston 198 engages limiter member 200 (see FIG. 7), which corresponds to a predetermined distance X which piston shaft 139 is inserted into chamber 156 of cylinder housing 158 (see FIG. 9). Thereafter, as piston shaft 139 is further inserted into chamber 156 of cylinder housing 158, the fluid within manifold 170 will attempt to urge piston 208 against the force of the high pressure nitrogen gas present in first portion 206a of chamber 206 of second cylinder 190 (see FIG. 9).

Figure 9:
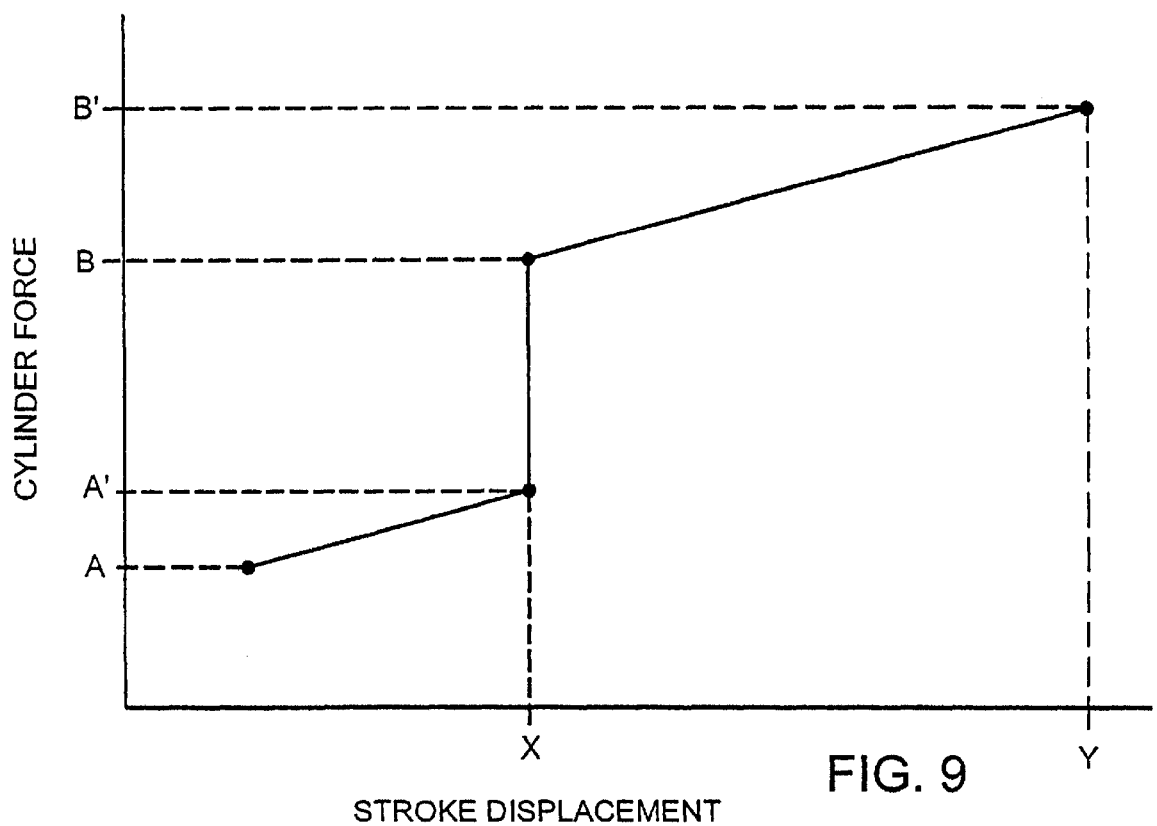
FIG. 9 is a graphical representation of the displacement of the belt tensioning device in response to the force thereon.

Referring to FIG. 9, the amount of force necessary to insert main piston shaft 139 a predetermined distance within chamber 156 of cylinder housing 158 gradually increases from an initial value A to an increased value A' as the low pressure nitrogen gas is compressed in first portion 196a of primary-dampening chamber 196 in cylinder 184 by piston 198 being urged from the first to the second position by the fluid. Thereafter, the amount of force necessary to further insert piston shaft 139 a second predetermined distance Y-X within secondary-dampening chamber 156 of cylinder housing 158 gradually increases from an initial value B to an increased value B'. Since the nitrogen gas within secondary-dampening cylinder 190 is under greater pressure than the nitrogen gas within primary-dampening cylinder 184, a substantially greater force is required for piston shaft 139 to travel the predetermined distance Y-X than the initial predetermined distance X.

In operation, track apparatus 10 is mounted to an axle of a vehicle through drive wheel 12 as heretofore described. The axle of the vehicle is rotated in a conventional manner through the vehicle by its engine and through a transmission which can vary the speeds and allow for forward and reverse rotation. Flexible track 15 of track apparatus 10 is positioned over drive wheel 12 such that lugs 32 projecting from the inner surface 28 of flexible track 15 are received between corresponding pairs of drive members 30 projecting from outer surface 29 of outer rim 24 of drive wheel 12. As drive wheel 12 rotates, drive members 30 engage corresponding track lugs 32 and drive flexible track 15 about drive wheel 12. Thereafter, successive drive lugs 30 engage subsequent track lugs 32 extending from the inner surface 28 of flexible track 15 so as to drive flexible track 15 about drive wheel 12.

As flexible track 15 approaches leading idler wheels 137, track lugs 32 pass therebetween. In addition, the radially outer surfaces 137a of leading idler wheels 137 engage the inner surface 28 of flexible track 15 and direct the lower length of flexible track 15 into contact with a supporting surface such as a farmer's field. As flexible track 15 continues to be driven about drive wheel 12, lugs 32 pass between the pairs of leading and trailing bogie wheels 101 and 107, respectively. As previously described, the radially outer surfaces 101a and 107a of bogie wheels 101 and 107, respectively, engage the inner surface 28 of flexible track 15 along its lower length and insure contact of flexible track 15 with the supporting surface along the lower length of flexible track 15. Similarly, as flexible track 15 approaches trailing idler wheels 117, track lugs 32 on the inner surface 28 of flexible track 15 pass therebetween. The radially outer surfaces 117a of idler wheels 117 engage the inner surface 28 of flexible track 15 and guide flexible track 15 onto drive wheel 12 to form a continuous loop.

In the event that flexible track 15 engages an pbstruction on the supporting surface during operation of track apparatus 10, such obstruction may cause flexible track 15 to deflect thereby causing leading idler axle support 130 to pivot on mounting pin 132 and to urge main piston shaft 139 into main-cylinder chamber 156 of cylinder housing 158 through leading idler wheels 137 and leading idler axle 136. The amount of force necessary to insert the piston shaft 139 into chamber 156 of cylinder housing 158 (in other words, the amount of force necessary to allow flexible track 15 to deflect) gradually increases as piston shaft 139 is further inserted into chamber 156, as heretofore described. Once track system 10 clears the obstruction, the piston shaft 139 is urged back into its original position by the nitrogen gas in first portions 196a and 206a of chambers 196 and 206, respectively, in corresponding cylinders 184 and 190, respectively, so as to once again provide the proper tension on flexible track 15.

As described, the structure of track system 10 allows for deflection of the flexible track in response to obstructions or the like while maintaining the proper tension thereon. It can be appreciated that the tension on the flexible track may be adjusted by varying the pressure of the nitrogen gas in first portions 196a and 206a of chambers 196 and 206, respectively, in corresponding cylinders 184 and 190, respectively, and/or by varying the position of limiter member 200.

Various modes of carrying out the invention are contemplated as being within the scope of the following claims particularly pointing out and distinctly claiming the subject matter as regarded as the invention.

We claim:

1. A tensioning device for maintaining tension on a continuous flexible track of a track apparatus, the track apparatus including a frame, a drive wheel structure rotatably mounted with respect to the frame, and an idler assembly having an idler wheel engaging the track, the idler assembly being moveable with respect to the frame, the tensioning device comprising:
   a main-cylinder housing interconnected to one of the frame and and the idler assembly, the housing extending along an axis and defining a main chamber therein;
   a main piston having a first end operatively connected to the other of the frame and the idler assembly and a second end slidably received within the chamber, the piston movable between a retracted position and an extended position;
   a primary dampening structure for resisting movement of the piston toward the retracted position for a first predetermined axial length; and
   a secondary dampening structure for resisting movement of the piston toward the retracted position for a further axial length beyond the first predetermined axial length, the secondary dampening structure resisting movement of the piston independent of the primary dampening structure.

2. The tensioning device of claim 1 wherein the primary dampening structure includes:
   a primary cylinder extending along an axis and defining a primary chamber therein; and
   a primary piston slidably received in the primary cylinder and movable axially between a first and second position, the primary piston dividing the primary chamber into a first portion for receiving a pressurized gas and a second portion.

3. The tensioning device of claim 2 further comprising:
   a hydraulic fluid conduit interconnecting the main chamber and the second portion of the primary chamber; and
   a hydraulic fluid disposed within the second portion of the primary chamber, the main chamber, and the conduit therebetween.

4. The tensioning device of claim 3 wherein the secondary dampening structure includes:
   a secondary cylinder extending along an axis and defining a secodary chamber therein; and
   a secondary piston slidably received in the secondary cylinder and movable axially between a first and second position, the secondary piston dividing the secondary chamber into a first portion for receiving a pressurized gas and a second portion; whereby the conduit interconnects the main chamber and the second portion of the secondary chamber and wherein the hydraulic fluid is disposed within the second portion of the secondary chamber.

5. The tensioning device of claim 4 wherein the pressure of the pressurized gas in the first portion of the secondary chamber is greater than the pressure of the pressurized gas in the first portion of the primary chamber.

6. The tensioning device of claim 2 wherein the primary cylinder includes an inner surface which defines the primary chamber therein.

7. The tensioning device of claim 6 further comprising a limiter extending from the inner surface of the primary cylinder, the limiter limiting movement of the primary piston within the primary chamber.

8. The tensioning device of claim 2 wherein the secondary dampening structure includes:
   a secondary cylinder extending along an axis, defining a secondary chamber therein and having an input; and
   a secondary piston slidably received in the secondary cylinder and movable axially between a first and second position, the secondary piston dividing the secondary chamber into a first portion for receiving a pressurized gas and a second portion of the primary chamber therein.

9. The tensioning device of claim 8 further comprising:
   a manifold having an input, a first output operatively connected to the input of the primary cylinder, and a second input operatively connected to the input of the secondary cylinder;
   a hydraulic fluid disposed within the conduit for travel between the main chamber, the second portion of the primary chamber and the second portion of the secondary chamber.

10. The tensioning device of claim 1 wherein the idler assembly includes:
    an idler-axle support mounted with respect to the frame; and
    an idler axle extending through the idler-axle support, the idler wheel being mounted on the idler axle and movable with the axle between a non-deflected position corresponding to the extended position of the main piston and deflected position corresponding to the retracted position of the main piston.

11. The tensioning device of claim 10 wherein the primary and secondary dampening structures operate to progressively increase resistance to movement of the idler wheel toward the deflected position as the idler wheel moves toward the deflected position.

12. The tensioning device of claim 10 wherein the idler-axle support is pivotably mounted to the frame.

13. The tensioning device for maintaining tension on a continuous flexible track of a track apparatus, the track apparatus including a frame, a drive wheel structure rotatably mounted with respect to the frame, and an idler assembly having an idler wheel engaging the track, the idler assembly being movable with respect to the frame, the tensioning device comprising:

a main-cylinder housing interconnected to one or the frame and the idler assembly, the housing extending along an axis and defining a main chamber therein;

a main piston having a first end operatively connected to the other of the frame and the idler assembly and a second end slidably received within the chamber, the piston movable between a retracted position and an extended position, the dampening mechanism mounted at a position remote from the housing and piston and progressively increasing the force on the second end as the position moves toward the retected poisition.

14. The tensioning device of claim 13 further comprising a conduit operatively connecting the dampening mechanism and the second end and wherein the dampening mechanism includes:

a primary cylinder extending along an axis and defining a primary chamber therein;

a primary piston slidably received in the primary cylinder and movable axially between a first and second position, the primary piston dividing the primary chamber into a first portion for receiving a pressurized gas and a second portion;

a secondary cylinder extending along an axis and defining a secondary chamber therein;

a secondary piston slidably received in the secondary cylinder and movable axially between a first and second position, the secondary piston dividing the secondary chamber into a first portion for receiving a pressurized gas and a second portion, the second portion of the primary chamber interconnected to the second portion of the secondary chamber and the main chamber by the conduit; and a hydraulic fluid disposed within the conduit.

15. The tensioning device of claim 14 further comprising a first pressurized gas disposed within the first portion of the primary chamber for urging the pirmary piston toward the first position and a secondary pressurized gas disposed within the first portion of the secondary chamber for urging the secondary piston toward the first position.

16. The tensioning device of claim 15 wherein the pressure exerted by the second pressurized gas on the secondary piston is greater than the pressure exerted by the first pressurized gas on the primary piston.

17. The tensioning device of claim 14 wherein the primary cylinder includes an inner surface which defines the primary chamber therein.

18. The tensioning device of claim 17 further comprising a limiter extending from the inner surface of the primary cylinder, the limiter limiting movement of the primary piston within the primary chamber.

19. The tensioning device of claim 14 wherein the conduit includes:

a manifold having an input, a first output communicating with the second portion of the primary chamber, and a second output communicating with the second portion of the secondary chamber; and a flow tube interconnecting the input of the manifold and the main chamber.

20. The tensioning device of claim 13 wherein the idler assembly includes:

a idler-axle support mounted with respect to the frame; and an idler axle extending through the idler-axle support, the idler wheel being mounted on the idler axle and movable with the axle between a non-deflected position corresponding to the extended position of the main piston and a deflected position corresponding to the retracted position of the main piston.

21. The tensioning device of claim 20 wherein the idler-axle support is pivotably mounted to the frame.

* * * * *

UNITED STATES PATENT AND TRADEMARK OFFICE
CERTIFICATE OF CORRECTION

PATENT NO. : 6,543,861 B1
DATED : April 8, 2003
INVENTOR(S) : Kahle et al.

It is certified that error appears in the above-identified patent and that said Letters Patent is hereby corrected as shown below:

Column 9,
Line 47, delete "moveable" and substitute therefor -- movable --.

Column 10,
Line 47, after "portion" add -- in communication with the input of the secondary cylinder;
   whereby the primary cylinder includes an input in communication with the second portion --.
After line 53, add
   -- a hydraulic fluid conduit interconnecting the input of the manifold and the main chamber; and --
Line 66, after "and" add -- a --.

Column 11,
Line 8, delete "The" and substitute therefor -- A --.
Line 15, delete "or" and substitute therefor -- of --.
Line 22, delete "," and add -- ; and
   a dampering mechanism operatively connected to the second end and providing a force for resisting movement of the piston toward the retracted position, --.
Line 25, delete "retected poisition" and substitute therefor -- retracted position --.

Column 12,
Line 7, delete "primary" and substitute therefor -- primary --.
Line 8, delete "secondary" and substitute therefor -- second --.

Signed and Sealed this

Third Day of May, 2005

JON W. DUDAS
*Director of the United States Patent and Trademark Office*